United States Patent [19]

Hwang

[11] Patent Number: 5,414,472
[45] Date of Patent: May 9, 1995

[54] METHOD FOR ELIMINATING AN IMPULSE NOISE OF VIDEO SIGNAL AND APPARATUS THEREFOR

[75] Inventor: Humor Hwang, Suwon, Rep. of Korea

[73] Assignee: Samsung Electronics Co., Ltd., Kyungki-Do, Rep. of Korea

[21] Appl. No.: 144,319

[22] Filed: Nov. 1, 1993

[30] Foreign Application Priority Data

Oct. 30, 1992 [KR] Rep. of Korea ............... 92-20268

[51] Int. Cl.$^6$ ............................................. H04N 5/213
[52] U.S. Cl. .................................. 348/616; 348/607
[58] Field of Search ............... 348/607, 616, 618, 619, 348/622; 382/41, 42; 358/167, 463; 455/296, 307; H04N 5/213; 364/724.01, 724.03

[56] References Cited

U.S. PATENT DOCUMENTS 4,573,070 2/1986 Cooper.

Primary Examiner—James J. Groody
Assistant Examiner—David E. Harvey
Attorney, Agent, or Firm—Sughrue, Mion, Zinn, Macpeak & Seas

[57] ABSTRACT

A median filter adaptively increases a window size when there is a possibility that an impulse noise will be present in the median value. When it is determined that an impulse noise is not present in the median value obtained as a median-filtering result, the median filter checks whether or not an impulse noise is present in a target pixel value which is to be subjected to median filtering. When there is a possibility that an impulse noise is present in the target pixel value, the median filter outputs the median value. On the other hand, when an impulse noise is not present in the median value as a check result, the median filter outputs the input target pixel value. Accordingly, an impulse noise can be effectively eliminated from a video signal mixed with a positive impulse noise and a negative impulse noise, while the edge change of the video signal produced by the median filter itself can be minimized. An adaptive median filter is also described.

16 Claims, 3 Drawing Sheets

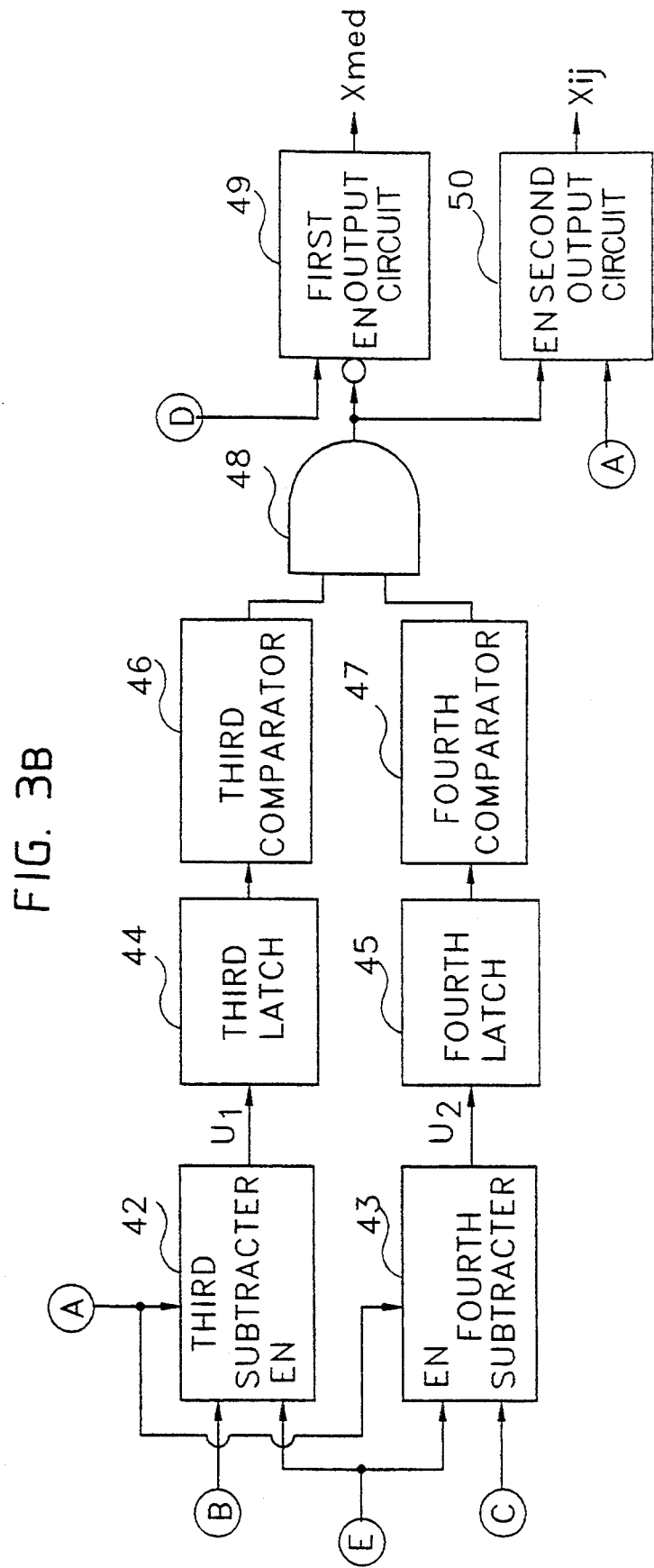

METHOD FOR ELIMINATING AN IMPULSE NOISE OF VIDEO SIGNAL AND APPARATUS THEREFOR

BACKGROUND OF THE INVENTION

1. Field of the Invention

The present invention relates to a median filter for eliminating an impulse noise component corrupting a video signal. More specifically, the present invention relates to a median filter for executing a filtering operation while adaptively changing the size of window for filtering of the video signal. Advantageously, the present invention can be used either in a receiver of FM signals associated with satellite broadcasting or in a television receiver susceptible to receiving an electromagnetic wave containing interference.

Korean Patent Application No 92-20268 is incorporated by reference for all purposes.

2. Description of the Prior Art

In general, an impulse noise component is often added to a video signal of television. The impulse noise in the video signal may be produced by the lower S/N ratio associated with broadcasting of FM signal via satellite as well as provided by an electromagnetic wave interference in a receiver side of television signal. The impulse noise in the FM signal is produced by incongruously tracking an original frequency band of the FM signal the user intends to demodulate within the receiver. The impulse noise from electromagnetic wave is produced by an electric motor and the like, and it can take a band form made of one line or a number of lines. Such an impulse noise produces a portion of the demodulated signal which is incongruous with the original signal.

One proposed solution for eliminating the impulse noise is a median filter. FIG. 1 is a block diagram for schematically showing a conventional median filter. Pixel data, e.g., 8 bits of pixel data $D_{IN}$, is continuously applied to and stored in a memory 12. Since the pixel data $D_{IN}$ consists of 8 bits, one pixel has a resolution of "0–255". The memory 12 supplied with pixel data stores picture data of a predetermined region dictated by memory capacity and supplies the pixel data included in a window of predetermined magnitude, i.e., size, to a sorter 14. The sorter 14 sorts the pixel data supplied from memory 12 according to a magnitude of data, and outputs a median value $X_{med}$ obtained by sorting. The median value $X_{med}$ output from the sorter 14 can be expressed as the following expression (1).

$$X_{med} = MEDIAN\{X_j\}^\omega_{j=1} \qquad (1)$$

where $\omega$ is the number of pixels included in the window.

However, since this conventional median filter includes a fixed window magnitude, which is a unit of data processing, for calculating a median value, it cannot adaptively cope with a distribution change of pixel values. More particularly, where a positive impulse noise and a negative impulse noise are mixed in a video signal subjected to median filtering, the impulse noise eliminating capacity becomes worse. Moreover, when there is no impulse noise in the window data, the edge of the video signal is changed or shifted.

SUMMARY OF THE INVENTION

The principal purpose of the present invention is to provide an adaptive median filter suitable for video signal processing.

An object of the present invention is to provide a ranked order based adaptive median filtering (RAMF) method which calculates a median value by adaptively changing the size of the window, which defines the data processing unit of the median filter, in response to a distribution change of pixel values.

Another object of the present invention is to provide a ranked order based adaptive median filtering (RAMF) method capable of improving a capacity of median filtering by providing the data of a target pixel prior to performing median filtering when there would be no impulse noise in the target pixel subjected to median filtering.

Still another object of the present invention is to provide an apparatus adapted to performing the aforementioned ranked order based adaptive median filtering method.

These and other features and advantages are provided by a method for eliminating an impulse noise from a digital video signal by median-filtering the pixel data. More specifically, the ranked order based adaptive median filtering method includes steps for forming a window comprising a number of pixels including a target pixel which is to be median filtered and a plurality of surrounding pixel, thereby forming said window of predetermined size, sorting pixel values representing said pixels forming the window in order of magnitude, calculating a median value of said sorted pixel values, checking whether or not there is an impulse noise in said median value, changing a size of said window when there is a possibility that an impulse noise in said median value exists, checking whether or not there was an impulse noise in a target pixel value before being subjected .median filtering when an impulse noise would not be present in said median value at said first checking step, providing a median value when there is a possibility of an impulse noise existing at said second checking step, and providing a target pixel value before median filtering when there would not be an impulse noise associated with the second checking step.

These and other objects, features and advantages of the present invention are provided by an apparatus for eliminating an impulse noise by median-filtering the pixel data using a ranked order based adaptive median filtering technique. The apparatus includes:

a memory for storing pixel values corresponding to video information;

a circuit for establishing a window, the circuit being supplied with pixel values stored from the memory thereby making values of a plurality of pixels existing at a target pixel desired to be median-filtered in response to a window's size control signal and at neighbor of the target pixel and having a predetermined magnitude and form;

a sorter for sorting the pixel values of each pixels contained in the window in turn of order of size;

a calculator for calculating a median value of pixel values sorted at the sorter;

a first checking circuit for checking whether or not there would be an impulse noise in the median value;

a window size adjustor for producing a control signal for changing the size of the window in accordance with the checked result of the first checking circuit;

a second checking circuit for checking whether or not there would be an impulse noise in a target pixel value from the window setting circuit when it is determined that there would not be an impulse noise in the median value by the first checking circuit;

a first output circuit for providing the median value from the median value calculator when it is determined that there would be an impulse noise in the target pixel value obtained from the second checking circuit; and a second output circuit for providing a target pixel value from the window setting circuit when it is determined that there would not be a possibility of an impulse noise existing as determined by the second checking circuit.

These and other objects, features and advantages of the invention are disclosed in or apparent from the following description of preferred embodiments.

BRIEF DESCRIPTION OF THE DRAWINGS

The preferred embodiments are described with reference to the drawings, in which like elements are denoted by like or similar numbers, and in which:

FIGS. 3A and 3B collectively form a high level block diagram showing an embodiment of a RAMF apparatus according to the present invention.

DETAILED DESCRIPTION OF THE INVENTION

Hereinafter, a preferred embodiment of the present invention will be described in more detail with reference to the accompanying drawings.

A target pixel desired to be median-filtered and a number of pixels located around the target pixel make a window defining a region for median filtering. The pixels within the window exist in a state that is either corrupted or not corrupted by an impulse noise. When a pixel $e_{ij}$ exhibiting a corrupted state due to an impulse noise has a probability P, a predetermined pixel $X_{ij}$ within the window has a relationship according the expression (2).

$$X_{ij} = \begin{cases} e_{ij} \text{ (probability } P) \\ S_{ij} \text{ (probability } 1-P) \end{cases} \quad (2)$$

where $S_{ij}$ represents a pixel which is not corrupted by an impulse noise.

An algorithm according to the present invention advantageously is divided into two routines. Preferably, the first routine checks whether or not there would be a remaining impulse noise in a median value obtained by a median filtering. When there would not be a remaining impulse noise in the median value, the second routine is performed to determine whether or not a target pixel, before median filtering, is corrupted by an impulse noise. When there is no impulse noise in the target pixel during this check, the target pixel is output unchanged. On the other hand, when it is determined that the target pixel is corrupted by an impulse noise, a median value determined by the first routine is output. Advantageously, when an impulse noise is still remains in the median value at the end of the first routine, the first routine is executed again for a window which has been increased in magnitude.

Figure 1:
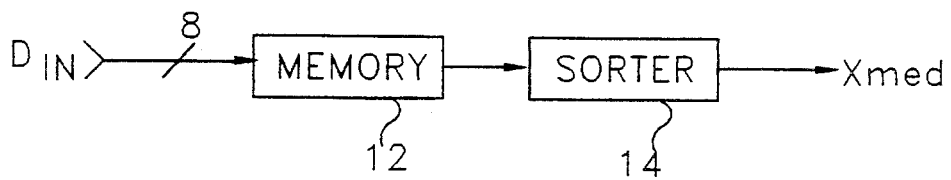
FIG. 1 is a block diagram showing an example of conventional median filter.
Figure 2:
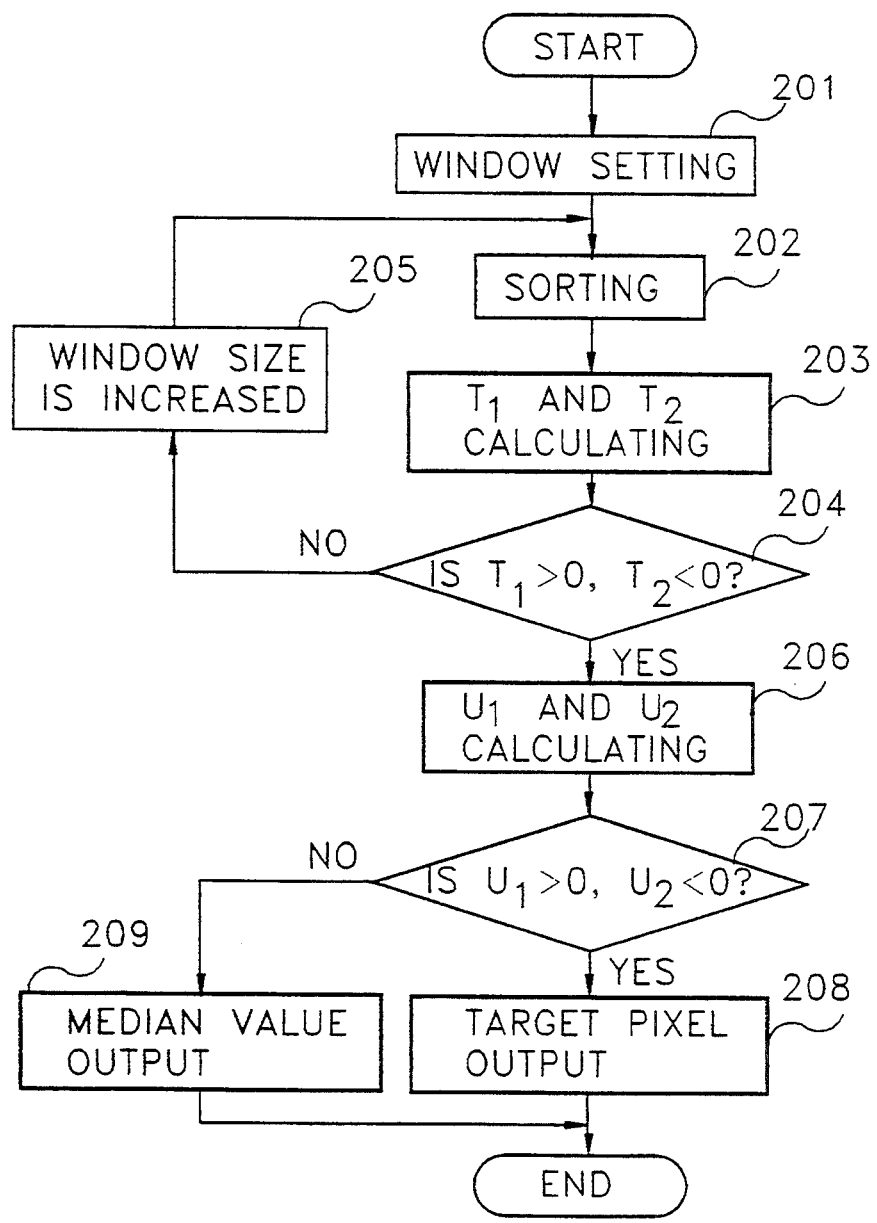
FIG. 2 is a flowchart illustrating an embodiment of a RAMF method according to the present invention.

FIG. 2 is an flowchart which is useful in explaining a method according to a preferred embodiment of the present invention, i.e., a ranked order based adaptive median filtering (RAMF) method. A window defined by a predetermined number $\omega$ of pixels is established during Step 201 of FIG. 2 and then respective pixel values within this window are sorted by magnitude during Step 202. A median value $X_{med}$, a maximum value $X_{max}$ and a minimum value $X_{min}$ for the pixels within the window are determined by sorting. The median value takes one of of three forms expressed by the expression (3) with respect to an impulse noise.

$$X_{med} = \begin{cases} S_{min} \\ S_{ij} \\ S_{max} \end{cases} \quad (3)$$

where $S_{ij}$, which ranges between $S_{min}$ and $S_{max}$, is a median value having no impulse noise, $S_{min}$ is a median value for a state corrupted by a negative impulse noise, and $S_{max}$ is a median value for a state corrupted by a positive impulse noise.

In an exemplary case where the pixel value has a length of "8" bits, the $S_{min}$ is possible in "$0_{10}$", the $S_{max}$ is possible in "$255_{10}$". The states capable of having by the median value $X_{med}$, i.e., the states expressed by the expression (3) are replaced by the letters $H_1$, $H_2$, $H_3$, for convenience of explanation.

$H_1 = X_{med} = S_{min}$ $H_2 = X_{med} = S_{max}$ $H_3 = H_{med} = S_{ij}$

Expressions (4) and (5) advantageously can be utilized for judging whether or not there would be an impulse noise in the median value $X_{med}$ obtained by the sorting.

$T_1 = X_{med} - X_{min}$ \hfill (4)

$T_2 X_{med} - X_{max}$ \hfill (5)

where $X_{min}$ and $X_{max}$ denote the minimum value and the maximum value, respectively, inside the window. The median values $X_{med}$ of expressions (4) and (5) are one of the values $S_{min}$, $S_{ij}$, $S_{max}$ according to expression (3). Thus, when the values of $T_1$ and $T_2$ are calculated during Step 203, the values of $T_1$ and $T_2$ are examined to determine whether or not they are positive or negative values. i.e., it is determined whether or not the impulse noise is present in the median value during Step 204. Table 1 shows all possible cases for calculated $T_1$ and $T_2$. In Table 1, " ", "⊕", and "—" represents and AND operator, an exclusive-OR operator, and a SET COMPLEMENT, respectively. Symbols utilized in Table 2, which will be discussed later, are identical in meaning to those symbols used in Table 1.

| CASE | $T_1$ | $T_2$ | $T_1 \wedge T_2$ |
| --- | --- | --- | --- |
| 1 | 0 | 0 | $H_1 \overline{H_2} \overline{H_3}$ + $\overline{H_1} H_2 \overline{H_3}$ + $H_1\ H_2 H_3$ |

-continued

| CASE | T$_1$ | T$_2$ | T$_1$ ∧ T$_2$ |
|------|-------|-------|---------------|
| 2 | 0 | negative | H$_1$ ⊕ H$_3$ |
| 3 | positive | 0 | H$_2$ ⊕ H$_3$ |
| 4 | positive | negative | H$_3$ |

A first case represents the three different possibilities for the expression (3) as a median value X$_{med}$, i.e., the states wherein a median value S$_{min}$ having a negative impulse noise, a median value S$_{max}$ having a positive impulse noise and a median value S$_{ij}$ having no impulse noise, are all possibly present.

The second case represents the state in which the median value S$_{ij}$ has no impulse noise and the median value S$_{min}$ has a negative impulse noise are possibly present in a median value. The third case represents a state in which a median value S$_{ij}$ and a median value S$_{max}$ are possibly to present in a median value. The fourth case represents the case in which a median value is S$_{ij}$, i.e., an impulse noise, is not present in the median value. In summary, the cases 1 to 3 of Table 1 are those cases for which a probability exists that an impulse noise is included in the median value, while the fourth case denotes the case in which an impulse noise does not exist in the median value. Accordingly, when T$_1$>0 and T$_2$<0, the second routine is executed; in all other cases, the size of the window is increased. That is, the number of pixels included in the window is increased during Step 205. Sorting Step 202 all subsequent steps are executed after the window has been increased in size. In the case where T$_1$>0 and T$_2$<0, the values of U$_1$ and U$_2$, which terms are defined by expressions (6) and (7), are calculated.

$$U_1 = X_{ij} - X_{min} \quad (6)$$

$$U_2 = X_{ij} - X_{max} \quad (7)$$

where the term X$_{ij}$ used in expressions (6) and (7) represents the target pixel before being median-filtered. The target pixel X$_{ij}$ exists in one of three possible states representing the magnitude and polarity of the impulse noise, which states are similar to the states described above with respect to the median value X$_{med}$.

$$E_1: X_{ij} = S_{min}$$

$$E_2: X_{ij} = S_{max}$$

$$E_3: X_{ij} = S_{ij}$$

where S$_{min}$ represents a target pixel corrupted by a negative impulse noise. S$_{max}$ represents a target pixel corrupted by a positive impulse noise, and S$_{ij}$ represents a target pixel which is not corrupted. The state of target pixel X$_{ij}$ and the values of U$_1$ and U$_2$ utilizing expressions (6) and (7) are calculated during Step 206.

| CASE | U$_1$ | U$_2$ | U$_1$ ∧ U$_2$ |
|------|-------|-------|---------------|
| 5 | 0 | 0 | impossible |
| 6 | 0 | negative | E$_1$ ⊕ E$_3$ |
| 7 | positive | 0 | E$_2$ ⊕ E$_3$ |
| 8 | positive | negative | E$_3$ |

Table 2 shows all possible cases represented by U$_1$ and U$_2$. The fifth case is that of U$_1$=0 and U$_2$=0, i.e., a case in which a target pixel X$_{ij}$ prior to the filtering is a maximum value X$_{max}$ and a minimum value X$_{min}$, meaning that it is impossible to know how much impulse noise is contained within the target pixel X$_{ij}$. The sixth case shows that two cases are possible in which an impulse noise is not present in the target pixel X$_{ij}$ or a negative pulse noise is present. The seventh case shows that two cases are possible in which an impulse noise is not present in the target pixel X$_{ij}$ or a positive impulse noise is present. The eighth case illustrates a case where an impulse noise is not present in the target pixel X$_{ij}$ before median filtering. Accordingly, the sixth and seventh case output a median value X$_{med}$ during Step 209. Moreover, the eighth case outputs a target pixel value X$_{ij}$ which is not corrupted by an impulse noise during Step 208.

Figure 3A:
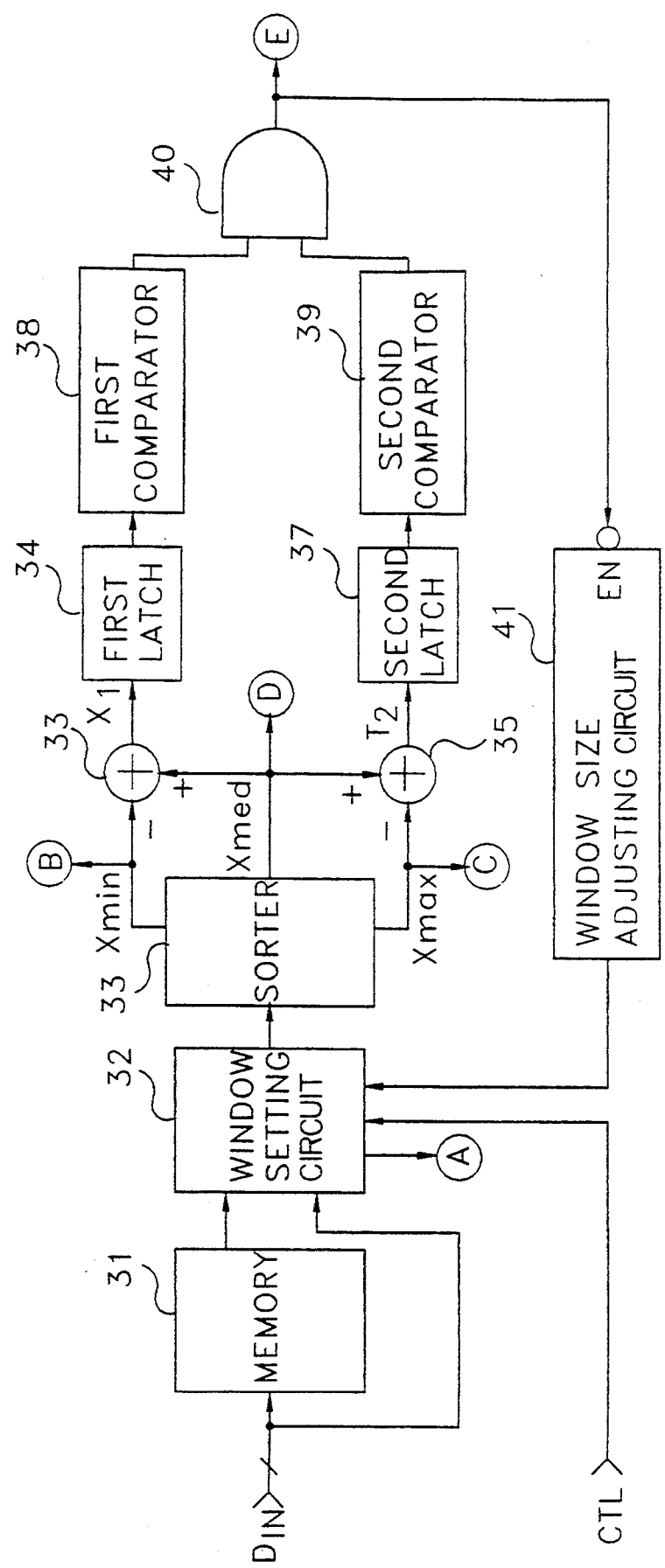

FIGS. 3A and 3B collectively provide a high level block diagram showing an apparatus embodying the RAMF algorithm of FIG. 2. The data D$_{IN}$ of pixels made of 8 bit data are input in order and stored to a memory 31. The memory 31 is a line data storing DRAM having a predetermined data storing capacity; the data input and output with respect to memory 31 are controlled by a start and end signal synchronized to a horizontal line. Preferably, an address signal accessing the memory 31 is automatically changed in response to the reading and writing operations of memory 31. The data read out of the memory 31 is fed to a window setting circuit 32. The window setting circuit 32 is made so as to be able to directly be supplied with pixel data D$_{IN}$ input not only from the memory 31 but also directly to the RAMF device. The window setting circuit 32 supplies the data of the target pixel X$_{ij}$ desired to median filter to a second output circuit 50. A window control signal CTL fed to the window setting circuit 32 is utilized for window form determination by the window setting circuit 32. When the pixel data contained within the window having a predetermined size and form are fed to a sorter 33, the sorter 33 sorts respective pixels contained in the window in data magnitude order. During sorting, the sorter 33 compares two adjacent pixel data and sorts the pixels within the window, e.g., using a bubble sort routine and storing to a stack memory to order the data values. The sorter 33 outputs a minimum value X$_{min}$, a maximum value X$_{max}$ and a median value X$_{med}$ determined by the pixels sorted in data magnitude order. The median value X$_{med}$ is stored to a first output circuit 49.

A first subtracter 34 subtracts a minimum value X$_{min}$ from the median value X$_{med}$ and outputs its result T$_1$ to a first latch 36. A second subtracter 35 subtracts the maximum value X$_{max}$ from the median value X$_{med}$ and outputs its result T$_2$ to a second latch 37. A first comparator 38 determines whether or not output value T$_1$ of the first latch 36 is greater than "0". A second comparator 39 determines whether or not output value T$_2$ of the second latch 37 is less than "0". The output values of the two comparators are input to a first logic product circuit 40. The first logic product circuit 40 outputs a high level signal only when "T$_1$>0" and "T$_2$<0", and outputs a low level signal all other cases. The output of the first logic product circuit 40 is fed to enable signal input terminals of a window size adjustor 41 and third and fourth subtracters 42 and 43.

The window size adjustor 41 is enabled when the output value of the first logic product circuit 40 is a low level. When an enable signal is input, the window size adjustor 41 increases the size of the window. Accordingly, the size of the window is increased by a predetermined number of pixels except where "$T_1>0$" and "$T_2<0$". The pixels within the window are increased in size and are sorted again at the sorter 33. The window increased in size has pixels additionally included by the size increase.

On the other hand, when the output of the first logic product circuit 40 is high level, i.e., "$T_1>0$" and "$T_2<0$", the third subtracter 42 calculates a value of $U_1$ and the fourth subtracter 43 calculates a value of $U_2$. Subtracted results $U_1$ and $U_2$ respectively output from the third subtracter 42 and the fourth subtracter 43 are latched, respectively, to the third latch 44 and the fourth latch 45. The third comparator 46 compares whether or not a value $U_1$ in the third latch 44 is greater than "0". The fourth comparator 47 compares whether or not a value $U_2$ in the fourth latch 45 is less than "0". The compared results of the third and fourth comparators 46 and 47 are input to the second logic product circuit 48. The second logic product circuit 48 outputs a high level signal only when "$U_1>0$" and "$U_2<0$", and outputs a low level signal in all other cases.

The output of the second logic product circuit 48 is fed to an output enable terminal of the output circuit 49 and 50. The first output circuit 49 is enabled by a low level signal of the logic product circuit 48 and outputs a median value $X_{med}$ fed from the sorter 33. The second output circuit 50 is enabled by its high level signal and outputs a target pixel $X_{ij}$ which is not corrupted by the impulse noise.

As described above, the RAMF method and apparatus in accordance with the present invention median-filters a target pixel by a window unit of predetermined size, and determines whether or not there is a possibility that an impulse noise is present in the median value. When there is a possibility that an impulse noise is present, a size of the window is increased and the median filtering is executed again. When it is determined that an impulse noise is not present in the median value, the median filter checks whether or not an impulse noise is present in the target pixel which has not yet been filtered. On the other hand, when there is a possibility that an impulse noise is present in the target pixel, the median filter outputs a median value. When it is determined that an impulse noise is not present in the target pixel, the median filter outputs an unchanged target pixel value. Accordingly, a median-filtering for a pixel can be done regardless of whether negative impulse noise and/or positive impulse noise is added to the target pixel. Moreover, the edge change of the video signal by median filter itself can be settled.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for eliminating an impulse noise from digital video signal by median-filtering pixel data using ranked order based adaptive median-filtering, said method comprising the steps of:
    (a) making a window of a predetermined size in response to receiving a number of pixels including a target pixel, which target pixel has a potential to be median-filtered, and a plurality of neighboring pixels;
    (b) sorting respective values of said pixels forming said window in magnitude order to thereby produce sorted pixel values;
    (c) calculating a median value in response to said sorted pixel values;
    (d) checking whether or not a possibility that an included impulse noise is present in said median value;
    (e) changing the size of said window when said possibility that said included impulse noise exists in said median value and repeating said steps (b) through (d);
    (f) checking whether or not a possibility that a pixel impulse noise is present in a target pixel value of said pixel values when said possibility of said included impulse noise is not present in said median value during said checking step (d);
    (g) providing said median value as said target pixel value when there is said possibility that said pixel impulse noise is present during said checking step (f); and
    (h) providing said target pixel value when said possibility that said pixel impulse noise is not present at said checking step (f).

2. The ranked order based adaptive median-filtering method as recited in claim 1, wherein step (e) comprises increasing the size of said window when said possibility that said included impulse noise is present in said median value during said checking step (d).

3. The ranked order based adaptive median-filtering method as recited in claim 1, wherein said checking step (d) comprises the steps of:
    (i) subtracting a minimum value obtained during said sorting step (b) from said median value to thereby provide a first subtracted resultant value;
    (j) subtracting a maximum value of said sorted pixel value obtained during said sorting step (b) from said median value to thereby produce a second subtracted resultant value;
    (k) comparing whether or not said first subtracted resultant value of said subtracting step (i) is greater than "0";
    (l) comparing whether or not said second subtracted resultant value of said subtracting step (j) is less than "0"; and
    (m) when the first subtracted resultant value of said subtracting step (i) is greater than "0" and the second subtracted resultant value of said subtracting step (j) is less than "0", determining that said included impulse noise is not present in said median value.

4. The ranked order based adaptive median-filtering method as recited in claim 3, wherein the size of said window is increased during said step (e) when a selected one of the first subtracted resultant value of said subtracting step (i) is not greater than "0" and the second subtracted resultant value of said subtracting step (j) is not less than "0".

5. The ranked order based adaptive median-filtering method as recited in claim 3, wherein said checking step (f) is executed when the first subtracted resultant value of said comparing step (k) is greater than "0", and the second subtracted resultant value of said comparing step (l) is less than "0".

6. The ranked order based adaptive median-filtering method as recited in claim 1, wherein said checking step (f) comprises the steps of:

(n) subtracting a minimum value of said sorted pixel values obtained by said sorting step (b) from said target pixel value to produce a first subtracted resultant value;

(o) subtracting a maximum value of said sorted pixel values obtained by said sorting step (b) from said target pixel value to produce a second subtracted resultant value;

(p) comparing whether or not the first subtracted resultant value of said subtracting step (n) is greater than "0";

(q) comparing whether or not the second subtracted resultant value of said subtracting step (o) is less than "0"; and (r) determining that said pixel impulse noise is not present in said target pixel value when the first subtracted resultant value of said subtracting step (n) is greater than "0" and the second subtracted resultant value of said subtracting step (o) is less than "0".

7. The ranked order based adaptive median-filtering method as recited in claim 6, wherein said providing step (g) is executed when the first subtracted resultant value of said comparing step (p) is not greater than "0" or the second subtracted resultant value of said comparing step (q) is not smaller then "0".

8. The ranked order based adaptive median-filtering method as recited in claim 7, wherein said providing step (h) is executed when the first subtracted resultant value of said comparing step (p) is greater than "0", and the second subtracted resultant value of said comparing step (q) is less than "0".

9. An apparatus for eliminating an impulse noise by median-filtering pixel data containing the impulse noise using a ranked order based adaptive median-filtering apparatus, said apparatus comprising:

a memory for storing pixel values representing video information;

a window setting circuit supplied with said pixel values from said memory, including values of a respective target pixel desired to be median-filtered in response to a window size control signal and a number of pixels located around said target pixel, each of said pixel values having a predetermined magnitude and form;

a sorter for sorting pixel values of respective pixels contained in said window in magnitude order to thereby produce sorted pixel values;

a median value calculator for calculating a median value of said sorted pixel values;

a first checking circuit for checking whether or not there is a possibility that an included impulse noise is present in said median value;

a window size adjustor producing said window size control signal for changing the size of said window in accordance with a first check result of said first checking circuit;

a second checking circuit for checking whether or not there is a possibility that a pixel impulse noise is present in said respective target pixel value from said window setting circuit when it is determined that said possibility of said included impulse noise is not present in said median value produced by said first checking circuit;

a first output circuit for providing said median value from said median value calculator when it is determined that said possibility that said pixel impulse noise is present in said target pixel value; and a second output circuit for providing a target pixel value from the window setting circuit when it is determined by said second checking circuit that said possibility that said pixel impulse noise does not exist.

10. The ranked order based adaptive median-filtering apparatus as recited in claim 9, wherein said window size adjustor produces said window size control signal for increasing the size of said window based on determination by said first checking circuit that there is said possibility that said included impulse noise is present in said median value.

11. The ranked order based adaptive median-filtering apparatus as recited in claim 9, wherein said first checking circuit comprises:

a first subtracter for subtracting a minimum value of said sorted pixel values from said median value;

a second subtracter for subtracting a maximum value provide by said sorter from said median value;

a first comparator for providing a high level signal when an output of said first subtracter is greater than "0";

a second comparator for providing a high level signal when an output of said second subtracter is less than "0"; and a first logic product circuit for logically operating on respective outputs of said first comparator and said second comparator.

12. The ranked order based adaptive median-filtering apparatus as recited in claim 11, wherein said window size adjustor is enabled when said first logic product circuit produces a low level signal.

13. The ranked order based adaptive median-filtering apparatus as recited in claim 12, wherein said second checking circuit is enabled when said first logic product circuit produces a high level signal.

14. The ranked order based adaptive median-filtering apparatus as recited in claim 9, wherein said second checking circuit comprises:

a third subtracter for subtracting a minimum value produced by said sorter from said target pixel value;

a fourth subtracter for subtracting a maximum value produced by said sorter from said target pixel value;

a third comparator for providing a high level signal when an output of said third subtracter is greater than "0";

a fourth comparator for providing a high level signal when an output of said fourth subtracter is less than "0"; and a second logic product circuit for logic product operating on respective outputs of said third comparator and said fourth comparator.

15. The ranked order based adaptive median-filtering apparatus as recited in claim 14, wherein said first output circuit outputs said median value when a low level signal is fed from said second logic product circuit.

16. The ranked order based adaptive median-filtering apparatus as recited in claim 15, wherein said second output circuit outputs said target pixel value when a high level signal is fed from said second logic product circuit.

* * * * *